US006811805B2

(12) United States Patent
Gilliard et al.

(10) Patent No.: US 6,811,805 B2
(45) Date of Patent: Nov. 2, 2004

(54) METHOD FOR APPLYING A COATING

(75) Inventors: Allen Gilliard, Buford, GA (US); Lynn Cook Winterton, Alpharetta, GA (US); Rafael Victor Andino, Lawrenceville, GA (US); John Lally, Lilburn, GA (US)

(73) Assignee: Novatis AG, Basel (CH)

( * ) Notice: Subject to any disclaimer, the term of this patent is extended or adjusted under 35 U.S.C. 154(b) by 224 days.

(21) Appl. No.: 10/154,249

(22) Filed: May 22, 2002

(65) Prior Publication Data
US 2002/0182316 A1 Dec. 5, 2002

Related U.S. Application Data
(60) Provisional application No. 60/294,407, filed on May 30, 2001, and provisional application No. 60/312,199, filed on Aug. 14, 2001.

(51) Int. Cl.⁷ ............................................... A61L 5/103
(52) U.S. Cl. ........................ 427/2.1; 427/2.8; 427/164; 427/258; 427/261; 427/265; 427/407.1; 427/421; 427/422; 427/475; 427/485; 427/486; 427/561; 427/600
(58) Field of Search .......................... 427/2.1, 164, 258, 427/261, 265, 407.1, 421, 422, 475, 485, 486, 561, 600

(56) References Cited
U.S. PATENT DOCUMENTS

| 4,923,123 A | 5/1990 | Rutz et al. ................. 239/691 |
|---|---|---|
| 4,993,645 A | 2/1991 | Buschor ..................... 239/708 |
| 5,530,465 A | 6/1996 | Hasegawa .................... 347/70 |
| 5,582,348 A | 12/1996 | Erickson et al. .............. 239/9 |
| 5,624,608 A | 4/1997 | Ching et al. ................. 261/30 |
| 5,630,793 A | 5/1997 | Rowe ........................ 604/20 |
| 5,936,705 A | 8/1999 | Ocampo et al. ............ 351/162 |
| 2002/0174800 A1 * | 11/2002 | Moreland ................ 106/31.02 |

FOREIGN PATENT DOCUMENTS

| WO | WO 99/35520 | 7/1999 |
|---|---|---|
| WO | WO 01/40846 | 6/2001 |

OTHER PUBLICATIONS

European Search Report.

* cited by examiner

Primary Examiner—Bernard Pianalto
(74) Attorney, Agent, or Firm—Jian Zhou; Rob Gorman; R. Scott Meece

(57) ABSTRACT

The invention provide a method for applying a coating to an ophthalmic lens or a mold for making the ophthalmic lens or a medical device other than ophthalmic lens. The method comprises spraying at least one layer of a coating liquid onto an ophthalmic lens using a spraying process selected from the group consisting of an air-assisted atomization and dispensing process, an ultrasonic-assisted atomization and dispensing process, a piezoelectric assisted atomization and dispensing process, an electro-mechanical jet printing process, a piezo-electric jet printing process, a piezo-electric with hydrostatic pressure jet printing process, and a thermal jet printing process. The coating can comprise a property/functionality pattern or a color image or combination of both.

22 Claims, 5 Drawing Sheets

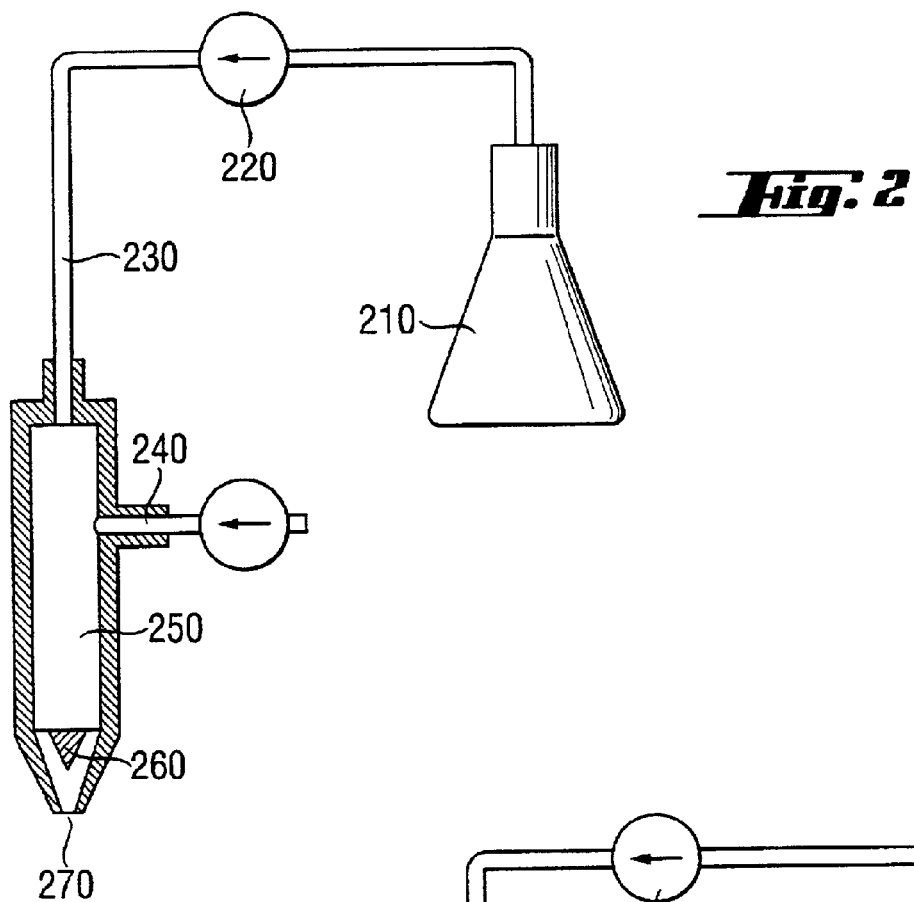
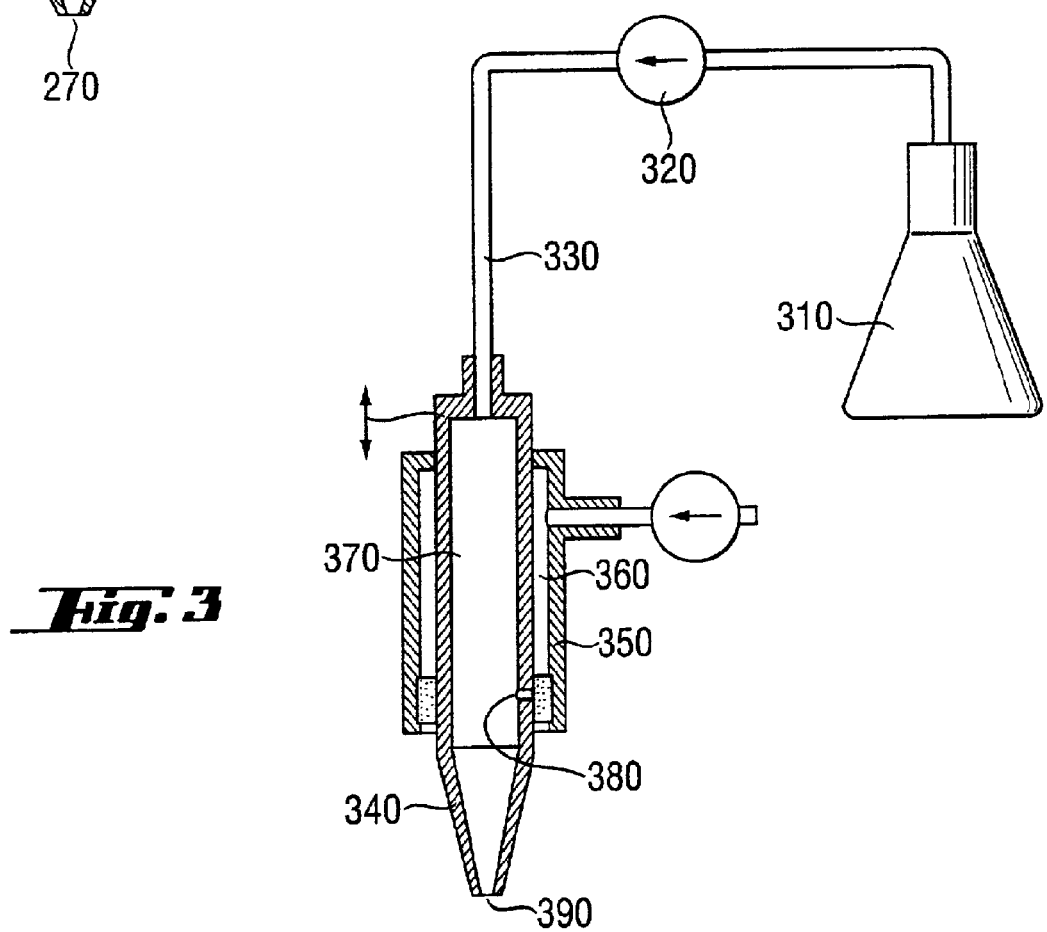

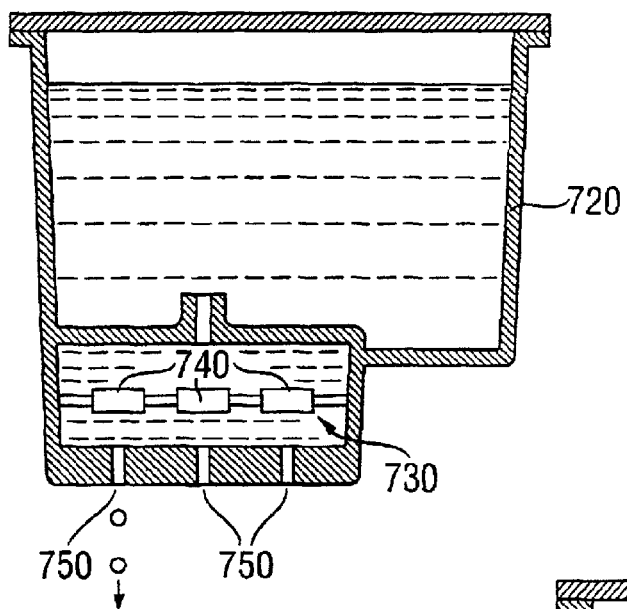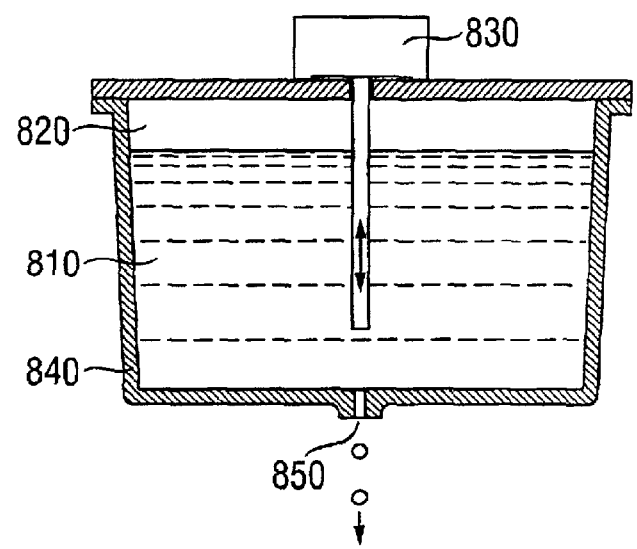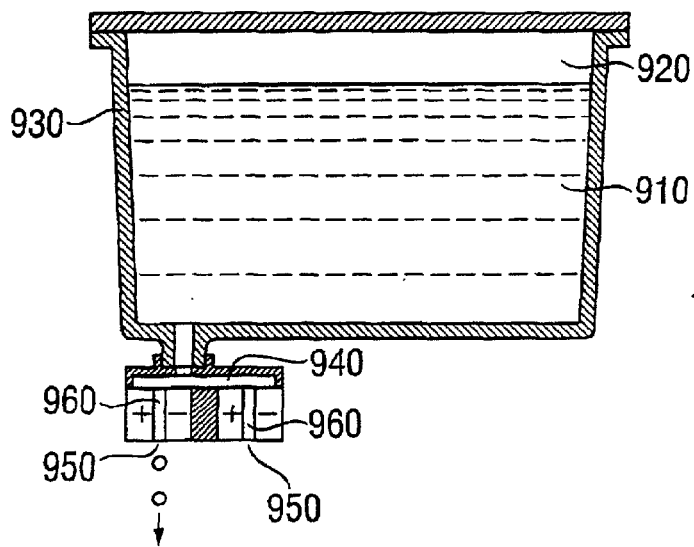

METHOD FOR APPLYING A COATING

This application claim the benefits under 35 USC §119(e) of U.S. provisional application Nos. 60/294,407 filed May 30, 2001 and 60/312,199 filed Aug. 14, 2001.

This invention generally relates to a method of treating polymeric materials, such as ophthalmic lenses and medical devices. In particular, this invention is directed to a coating/printing method and apparatus for modifying the surface properties and/or functions of an ophthalmic lens or a medical device.

BACKGROUND

Many devices used in biomedical applications require that the bulk of the device have one property, while the surface of the device has another property. For example, contact lenses may have high oxygen permeability through the lens to maintain good corneal health. However, materials that exhibit exceptionally high oxygen permeability (e.g. polysiloxanes) are typically hydrophobic and will adhere to the eye. Thus, a contact lens generally has a core or bulk material that is highly oxygen permeable and hydrophobic, and a surface that has been treated or coated to increase hydrophilic properties, thereby allowing the lens to freely move on the eye without adhering excessive amounts of tear lipid and protein.

In order to modify the hydrophilic nature of a relatively hydrophobic contact lens material, a contact lens can be treated with a plasma treatment. For example, a high quality plasma treatment technique is disclosed in PCT Publication No. WO 96/31793 to Nicholson et al. Some plasma treatment processes, however, require a significant monetary investment in certain equipment. Moreover, plasma treatment requires that the lens be dry before exposure to the plasma. Thus, lenses that are wet from prior hydration or extraction processes must be dried, thereby imposing added costs of obtaining drying equipment, as well as added time in the overall lens production process. As a result, a number of methods of altering the surface properties of polymeric biomaterials, such as contact lenses, have been developed. Some of these techniques include Langmuir-Blodgett deposition, controlled spin casting, chemisorption, and vapor deposition. Useful examples of Langmuir-Blodgett layer systems are disclosed in U.S. Pat. Nos. 4,941,997; 4,973,429; and 5,068,318.

A more recent technique used for coating electronic devices is a layer-by-layer ("LbL") polymer absorption process, which is described in "Investigation of New Self-Assembled Multilayer Thin Films Based on Alternately Adsorbed Layers of Polyelectrolytes and Functional Dye Molecules" by Dongsik Yoo, et al. (1996). The process described in this article involves alternatively dipping hydrophilic glass substrates in a polyelectrolyte solution (e.g., polycations such as polyallylamine or polyethyleneimine) and then in an oppositely charged dye solution to form electrically conducting thin films and light-emitting diodides (LEDs). After each dipping, the substrates are rinsed with acidic aqueous solutions. Both the dipping and rinsing solutions have a pH of 2.5 to 7. Prior to dipping, the surfaces of the glass substrates are treated in order to create a surface having an affinity for the polyelectrolyte.

Similar to the above process, two other processes are described by 1995 publications entitled "Molecular-Level Processing of Conjugated Polymers" by Fou & Rubner and Ferreira & Rubner, respectively. These processes involve treating glass substrates that have hydrophilic, hydrophobic, negatively, or positively charged surfaces. The glass surfaces are treated for extended periods in hot acid baths and peroxide/ammonia baths to produce a hydrophilic surface. Hydrophobic surfaces are produced by gas-phase treatment in the presence of 1,1,1,3,3,3-hexamethyldisilazane for 36 hours. Charged surfaces are prepared by covalently anchoring charges onto the surface of the hydrophilic slides. For example, positively charged surfaces are made by further treating the hydrophilic surfaces in methanol, methanol/toluene, and pure toluene rinses, followed by immersion in (N-2 aminoethyl-3-aminopropyl) trimethyloxysilane solution for 12 to 15 hours. This procedure produces glass slides with amine functionalities, which are positively charged at a low pH.

In addition to the above-described techniques, U.S. Pat. Nos. 5,518,767 and 5,536,573 to Rubner et al. describe methods of producing bilayers of p-type doped electrically conductive polycationic polymers and polyanions or water-soluble, non-ionic polymers on glass substrates. These patents describe extensive chemical pre-treatments of glass substrates that are similar to those described in the aforementioned articles.

The methods described above generally relate to layer-by-layer polyelectrolyte deposition. However, these methods require a complex and time-consuming pretreatment of the substrate to produce a surface having a highly charged, hydrophilic, or hydrophobic nature in order to bind the polycationic or polyanionic material to the glass substrate.

To reduce the complexity, costs, and time expended in the above-described processes, a layer-by-layer polyelectrolyte deposition technique was developed that could be effectively utilized to alter the surfaces of various materials, such as contact lenses. This technique is described in co-pending U.S. patent application Ser. No. 09/199,609 filed on Nov. 25, 1998. In particular, a layer-by-layer technique is described that involves consecutively dipping a substrate into oppositely charged polyionic materials until a coating of a desired thickness is formed. Nevertheless, although this technique provides an effective polyelectrolyte deposition technique for biomaterials, such as contact lenses, a need for further improvement still remains.

For example, this current LbL deposition technique is not capable of applying two or more materials having different properties/functionalities onto biomaterials, such as contact lenses, to form property/functionality patterns on the surfaces of the biomaterials. Such patterns can comprise multiple sets of zones each of which may have an unique property or functionality. Contact lenses with a plurality of different property/functionality zones may be useful, for example, for enhancing wearer's comfort and health and for administrating medicines to patients in a timely-controllable manner.

Another example is that this current LbL deposition technique is not capable of applying asymmetrically one coating material to one of the two surfaces of an intraocular lens and another different coating material to the other surface of that intraocular lens. Such asymmetrically coated intraocular lenses can have different surface properties, for example, one surface being hydrophobic and the other surface being hydrophilic.

As such, a need currently exists for a versatile method of applying different materials to form a coating on an ophthalmic lens or medical device. In particular, a need exists for a method of forming an coating with zones of different surface properties and/or functions onto contact lenses or medical devices.

An objective of the invention is to provide methods and systems for applying a layer of liquid coating to an ophthalmic lens or a mold used to produce the ophthalmic lens or a medical device other than ophthalmic lens.

Another objective of the invention is to provide an ophthalmic lens the surface of which is modified to increase wettability and thereby to increase further the wearer's comfort by using the above methods and systems of the invention.

A further objective of the invention is to provide a method for making an ophthalmic lens or a medical device other than ophthalmic lens, wherein the ophthalmic lens or medical device has a surface having two or more sets of zones each having a different surface property and/or function.

Still a further objective of the invention is to provide an ophthalmic lens or a medical device other than ophthalmic lens having a color image or a color image with a property/functionality pattern or micro-pattern.

SUMMARY OF THE INVENTION

The foregoing and other objectives are achieved by the various aspects of the invention described herein.

The invention, in one aspect, provides a method of applying a coating to an object, the method comprising spraying at least one layer of a coating liquid onto the object using a spraying process selected from the group consisting of an air-assisted atomization and dispensing process, an ultrasonic-assisted atomization and dispensing process, a piezoelectric assisted atomization and dispensing process, an electro-mechanical jet printing process, a piezo-electric jet printing process, a piezo-electric with hydrostatic pressure jet printing process, and a thermal jet printing process.

The invention, in another aspect, provides a method of applying a coating to an object, the method comprising: (a) spraying a first layer of a first coating liquid onto the object using a spraying process selected from the group consisting of an air-assisted atomization and dispensing process, an ultrasonic-assisted atomization and dispensing process, a piezoelectric assisted atomization and dispensing process, an electro-mechanical jet printing process, a piezo-electric jet printing process, a piezo-electric with hydrostatic pressure jet printing process, and a thermal jet printing process and (b) spraying at least a second layer of a second coating liquid onto the object using a spraying process selected from the group consisting of an air-assisted atomization and dispensing process, an ultrasonic-assisted atomization and dispensing process, a piezoelectric assisted atomization and dispensing process, a piezo-electric jet printing process, a piezo-electric with hydrostatic pressure jet printing process, and a thermal jet printing process.

The invention, in still another aspect, provides a method for producing a property/functionality pattern on a surface of an object, the method comprising the steps of applying a plurality of layers of one or more coating materials with different surface properties and/or functions, using a spraying process selected from the group consisting of an air-assisted atomization and dispensing process, an ultrasonic-assisted atomization and dispensing process, a piezoelectric assisted atomization and dispensing process, an electro-mechanical jet printing process, a piezo-electric jet printing process, a piezo-electric with hydrostatic pressure jet printing process, and a thermal jet printing process, and obtaining a coating having the property/functionality pattern on the object.

The invention, in yet another aspect, provides a method for making a contact lens having a color image thereon.

The invention, in a further aspect, provides an apparatus for applying a coating to an ophthalmic lens comprises: a means for securing the ophthalmic lens and a spraying device capable of spraying a layer of a coating liquid onto the ophthalmic lens using a spraying process selected from the group consisting of an air-assisted atomization and dispensing process, an ultrasonic-assisted atomization and dispensing process, a piezoelectric assisted atomization and dispensing process, an electro-mechanical jet printing process, an electro-mechanical jet printing process, a piezo-electric jet printing process, a piezo-electric with hydrostatic pressure jet printing process, and a thermal jet printing process.

The invention, in still a further aspect, provides an automated apparatus for applying a coating to an ophthalmic lens in a precision manner comprises: a means for securing the ophthalmic lens; a spraying device capable of spraying a layer of a coating liquid onto the ophthalmic lens using a spraying process selected from the group consisting of an air-assisted atomization and dispensing process, an ultrasonic-assisted atomization and dispensing process, a piezoelectric assisted atomization and dispensing process, an electro-mechanical jet printing process, an electro-mechanical jet printing process, a piezo-electric jet printing process, a piezo-electric with hydrostatic pressure jet printing process, and a thermal jet printing process; and a computer system capable of controlling the positioning of the dispensing head of the spraying device on the ophthalmic lens and dispensing the coating liquid.

These and other aspects of the invention will become apparent from the following description of the presently preferred embodiments taken in conjunction with the following drawings. The detailed description and drawings are merely illustrative of the invention and do not limit the scope of the invention, which is defined by the appended claims and equivalents thereof. As would be obvious to one skilled in the art, many variations and modifications of the invention may be effected without departing from the spirit and scope of the novel concepts of the disclosure.

BRIEF DESCRIPTION OF THE DRAWINGS

FIG. 2 schematically depicts another preferred device for applying a coating liquid to an object using an air-assisted atomization and dispensing process.

FIG. 3 schematically illustrates another preferred device for applying a coating liquid to an object using an air-assisted atomization and dispensing process.

FIG. 7 schematically depicts a preferred piezo-electric printing device.

FIG. 8 schematically depicts a preferred piezo-electric with hydrostatic pressure printing device.

FIG. 9 schematically depicts a preferred thermal jet printing device.

DETAILED DESCRIPTION OF THE PREFERRED EMBODIMENTS

Figure 1:
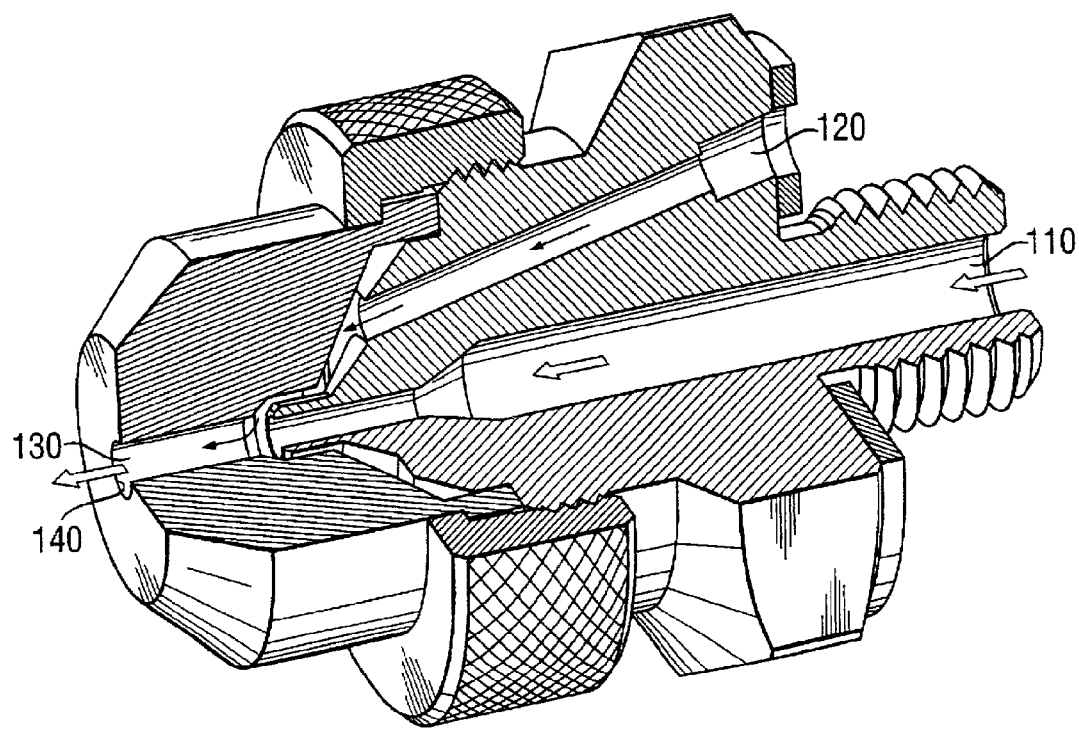
FIG. 1 schematically illustrate a preferred device for applying a coating liquid to an object using an air-assisted atomization and dispensing process.

In general, the present invention is directed to a method for applying a coating to an object comprising spraying at least one layer of a coating liquid onto an ophthalmic lens using a spraying process selected from the group consisting of an air-assisted atomization and dispensing process, an ultrasonic-assisted atomization and dispensing process, a piezoelectric assisted atomization and dispensing process, an electro-mechanical jet printing process, a piezo-electric jet printing process, a piezo-electric with hydrostatic pressure jet printing process, and a thermal jet printing process.

"An object" refers to an ophthalmic lens, a mold for making an ophthalmic lens, or a medical device other than ophthalmic lens.

"An ophthalmic lens", as used herein, refers to a contact lens (hard or soft), or an intraocular lens.

It has been discovered by some of the inventors in a U.S. patent application (Ser. No. 09/774,942) that formation of coatings on contact lenses can be achieved by first applying a coating to the mold sections and then transferring the coating onto the surface of a contact lens, which is made by depositing a curable mixture of polymerizable materials in a cavity formed by the mold sections, curing the mixture, and disassembling the mold assembly such that the formed lens can be removed therefrom. Although contact lenses are specifically discussed herein, it should be understood that any other device, such as intraocular lenses and medical devices, that can be formed by cast molding can have a coating applied utilizing the process disclosed in the U.S. patent application.

Methods of manufacturing mold sections for cast molding a contact lens are generally well known to those of ordinary skill in the art. The process of the present invention is not limited to any particular method of forming a mold. In fact, any method of forming a mold can be used in the present invention. However, for illustrative purposes, the following discussion has been provided as one embodiment of forming a mold that can be coated in accordance with the present invention.

In general, a mold can be formed from two mold halves, i.e. front and back mold halves, which themselves can be formed through various techniques, such as injection molding. These half sections can later be joined together such that a cavity forms therebetween. Thereafter, a contact lens can be formed within the cavity of the mold sections using various processing techniques, such as ultraviolet curing.

Examples of suitable processes for forming the mold halves are disclosed in U.S. Pat. No. 4,444,711 to Schad; U.S. Pat. No. 4,460,534 to Boehm et al.; 5,843,346 to Morrill; and U.S. Pat. No. 5,894,002 to Boneberger et al., which are also incorporated herein by reference.

Although it is normally desired that the mold be made from a material having at least some affinity to polyionic materials, virtually all materials known in the art for making molds can be used. For example, polyolefin materials, such as polyethylene and polypropylene can be used. UV-transmissive and/or UV-opaque materials can also be used. One such material that passes ultraviolet light is, for instance, polymethylmethacrylate (PMMA). In one embodiment, one portion of the mold is formed from a UV transmissive material, such as polymethylacrylate, so that UV light can later pass through the section to cure a polymerizable material dispensed within the mold. In another embodiment, another portion of the mold is formed from a UV-opaque material that blocks UV light.

Exemplary ultraviolet blockers that may be used within the present invention include screening agents, UV absorbers and excited state quenchers. UV screens are typically pigments, (such as carbon black) that absorb UV light, often absorb visible light, and transform the energy into infrared radiation. UV absorbers absorb UV light but absorb little, if any, visible light. They typically dispose of absorbed energy though heat or chemical changes. Excited-state quenchers convert energy produced by a reaction with photoexcited polymer molecules to infrared radiation. Exemplary UV absorbers include benzophenone, salicylate and benzotriazole. Commercially available benzotriazole absorbers include TINUVIN P, TINUVIN 326 and TINUVIN 1130, available from Novartis Corp., and ADK STAB LA 31, available from Asahi Denka. Derivatives of 2-hydroxy-benzophenone and hydroxy-benzotriazole, as well as phenylsalicylates, cyanoacrylates, O-hydroxyphenyl benzoltriazoles, resorcinol monobenzoate, phenol/resorcinol esters of tere- or isophthalic acids, may also be used. Suitable UV absorbers may include radical scavengers such as hindered phenols and piperidine derivatives. Excited-state quenchers include hindered amines and salts or chelates of cobalt, nickel or zinc Once a mold is formed, various above discussed polyionic materials and/or additives can be applied thereon.

Once a mold is sufficiently coated, a lens material can then be dispensed into a cavity formed by the connection of the mold halves. In general, a lens material of the present invention can be made from any polymerizable material. In particular, when forming a contact lens, the lens material may be an oxygen-permeable material, such as flourine- or siloxane-containing polymer. For example, some examples of suitable substrate materials include, but are not limited to, the polymeric materials disclosed in U.S. Pat. No. 5,760,100 to Nicolson et al., which is incorporated herein by reference. The lens material can then be cured, i.e. polymerized, to form a contact lens. One embodiment of such a process is disclosed in U.S. Pat. No. 5,894,002 to Boneberger et al., which is herein incorporated by reference.

"A medical device" as used herein refers to a device having surfaces that contact tissue, blood, or other bodily fluids of patients in the course of their operation. Exemplary medical devices include: (1) extracorporeal devices for use in surgery such as blood oxygenators, blood pumps, blood sensors, tubing used to carry blood and the like which contact blood which is then returned to the patient; (2) prostheses implanted in a human or animal body such as vascular grafts, stents, pacemaker leads, heart valves, and the like that are implanted in blood vessels or in the heart; (3) devices for temporary intravascular use such as catheters, guide wires, and the like which are placed into blood vessels or the heart for purposes of monitoring or repair; and (4) ophthalmic lenses.

A coating liquid can comprise polyionic materials and other materials that can change the hydrophilic properties and/or functions of the surface of an object. As used herein, a "polyionic material" refers to a polymeric material that has a plurality of charged groups, such as polyelectrolytes, p- and n-type doped conducting polymers. Polyionic materials include both polycationic (having positive charges) and polyanionic (having negative charges) materials.

A polycationic material used in the present invention can generally include any material known in the art to have a plurality of positively charged groups along a polymer chain. For instance, suitable examples of such polycationic materials can include, but are not limited to, poly(allylamine hydrochloride) (PAH), poly(ethyleneimine) (PEI), poly (vinylbenzyltriamethylamine) (PVBT), polyaniline (PAN or PANI) (p-type doped) [or sulphonated polyaniline], polypyrrole (PPY) (p-typed doped), poly(pyridinium acetylene).

A polyanionic material used in the present invention can generally include any material known in the art to have a plurality of negatively charged groups along a polymer chain. For example, suitable polyanionic materials can include, but are not limited to, polymethacrylic acid (PMA), polyacrylic acid (PAA), poly(thiophene-3-acetic acid) (PTAA), poly(4-styrenesulfonic acid) (PSS), sodium poly (styrene sulfonate) (SPS) and poly(sodium styrene sulfonate) (PSSS).

In order to alter various characteristics of the coating, such as thickness, the molecular weight of the polyionic materials can be varied. In particular, as the molecular weight is increased, the coating thickness generally increases. However, if the increase in molecular weight increase is too substantial, the difficulty in handling may also increase. As such, polyionic materials used in a process of the present invention will typically have a molecular weight $M_n$ of about 10,000 to about 150,000. In some embodiments, the molecular weight is about 25,000 to about 100,000, and in other embodiments, from about 75,000 to about 100,000.

In accordance with the present invention, polyionic material solutions can be prepared in a variety of ways. In particular, a polyionic solution of the present invention can be formed by dissolving the polyionic material(s) in water or any other solvent capable of dissolving the materials. When a solvent is used, any solvent that can allow the components within the solution to remain stable in water is suitable. For example, an alcohol-based solvent can be used. Suitable alcohols can include, but are not limited to, isopropyl alcohol, hexanol, ethanol, etc. It should be understood that other solvents commonly used in the art can also be suitably used in the present invention.

Whether dissolved in water or in a solvent, the concentration of a polyionic material in a solution of the present invention can generally vary depending on the particular materials being utilized, the desired coating thickness, and a number of other factors. However, it may be typical to formulate a relatively dilute aqueous solution of polyionic material. For example, a polyionic material concentration can be between about 0.001% to about 0.25% by weight, between about 0.005% to about 0.10% by weight, or between about 0.01% to about 0.05% by weight.

In general, the polyionic solutions mentioned above can be prepared by any method well known in the art for preparing solutions. For example, in one embodiment, a polyanionic solution can be prepared by dissolving a suitable amount of the polyanionic material, such as polyacrylic acid having a molecular weight of about 90,000, in water such that a solution having a certain concentration is formed. In one embodiment, the resulting solution is a 0.001M PAA solution. Once dissolved, the pH of the polyanionic solution can also be adjusted by adding a basic or acidic material. In the embodiment above, for example, a suitable amount of 1N hydrochloric acid (HCl) can be added to adjust the pH to 2.5.

Polycationic solutions can also be formed in a manner as described above. For example, in one embodiment, poly (allylamine hydrochloride) having a molecular weight of about 50,000 to about 65,000 can be dissolved in water to form a 0.001M PAH solution. Thereafter, the pH can also be adjusted to 2.5 by adding a suitable amount of hydrochloric acid.

In some embodiments of the present invention, it may be desirable to apply a solution containing both polyanionic and polycationic materials within a single solution. For example, a polyanionic solution can be formed as described above, and then mixed with a polycationic solution that is also formed as described above. In one embodiment, the solutions can then be mixed slowly to form the coating solution. The amount of each solution applied to the mix depends on the molar charge ratio desired. For example, if a 10:1 (polyanion:polycation) solution is desired, 1 part (by volume) of the PAH solution can be mixed into 10 parts of the PAA solution. After mixing, the solution can also be filtered if desired.

Alternatively, a coating liquid can comprise various other materials and/or additives. As used herein, an additive can generally include any chemical or material. Some examples of suitable additives include, but are not limited to, antimicrobials, antibacterials, colorants, cell growth inhibitors, visibility tinting agents, ultraviolet light tinting dyes, etc.

Some suitable antimicrobial materials include polyquaternary ammonium compounds, such as those described in U.S. Pat. No. 3,931,319 to Green et al. (e.g. "POLYQUAD"), which is incorporated herein by reference. Other antimicrobial or antibacterials that can be utilized in the present invention are peptides, other polyquats, mucin, mucin mimics, glycopeptides, glycoproteins, silk proteins, cellulose, dextran or other anti-microbial or anti-bacterial entities. Still other examples of such anti-bacterials or antmicrobials are disclosed in U.S. Pat. Nos. 5,866,113 to Hendriks et al. and 5,891,506 to Keogh, which are incorporated herein by reference.

Visibility tinting agents, ultraviolet light tinting dyes are various materials having radiation absorbing properties that are useful for ophthalmic lenses.

Still another example of a material that can be utilized in the present invention is a polyionic material that inhibits or induces cell growth. Cell-growth inhibitors can be useful in devices that are exposed to human tissue for an extended time with an ultimate intention to remove (e.g. catheters), while cell-growth inducing polyionic materials can be useful in permanent implant devices (e.g. artificial cornea).

"Colorant" means either a dye or a pigment or a mixture thereof that is used to print a color image on an object.

"Dye" means a substance that is soluble in a solvent and that is used to impart color. Dyes are typically translucent and absorb but do not scatter light. Dyes can cover both optical regions of contact lenses and non-optical regions of contact lenses. Nearly any dye can be used in the present invention, so long as it can be used in an apparatus as described below. These dyes include fluorescent dyes, phosphorescent dyes, pearlescent dyes, and conventional dyes.

"Fluorescence" means luminescence caused by absorption of visible light or ultraviolet radiation at one wavelength followed by nearly immediate emission at a longer wavelength. Fluorescent emission ceases almost immediately when the light or incident ultraviolet radiation stops.

"Phosphorescence" is luminescence caused by the absorption of radiation at one wavelength followed by delayed emission at a different wavelength. Phosphorescent emission continues for a prolonged time after the incident radiation stops.

"Pearlescence" means having a pearly luster; resembling a pearl in physical appearance; or having a nearly neutral slightly bluish medium gray color.

"Pigment" means a powdered substance that is suspended in a liquid in which it is relatively insoluble. Pigments are used to impart color. Because pigments are in the form of a suspension, they tend to have an opacity quality. That is, they reflect light and obstruct the passage of light. For this reason, it is preferred that pigments are located in non-optical regions of a contact lens.

Nearly any pigment can be used in the present invention, so long as it can be used in an apparatus as described below. Preferred pigments include fluorescent pigments, phosphorescent pigments, pearlescent pigments, and conventional pigments. Pigments can include any colorant permitted in medical devices and approved by the FDA, such as D&C Blue No. 6, D&C Green No. 6, D&C Red No. 17, D&C Violet No. 2, D&C Yellow No. 10, carbazole violet, certain copper complexes, certain chromium oxides, various iron oxides, phthalocyanine green, titanium dioxides, etc. See Marmiom DM Handbook of U.S. Colorants for a list of colorants that may be used with the present invention.

The colorants can be printed in a single layer or in many layers, and in any pattern that achieves desirable cosmetic effects. Preferred patterns of colorants include those identified in U.S. Pat. Nos. 5,936,705; 5,414,477; and 5,272,010, which are hereby incorporated by reference.

The patterns that the single or multiple layers of colorants form on the contact lenses are preferably comprised of zones, and the zones may be comprised of shaped colored regions within the zones. The shaped region may further be comprised of dots. Examples of zones include: a single annular iris color zone with irregular inner and outer borders, multiple concentric annular zones, annular zones with outer and inner starbursts, and a single iris zone but irregular in structure along multiple radial lines. Examples of shaped colored areas within zones include circular areas, ovular regions, irregular elongated regions in worm-like shapes, radial segments, and combinations of these shapes.

The addition of surfactants, particularly ionic surfactants may be helpful for optimal color dispersion.

In a preferred embodiment, the colored contact lens is coated with a binding solution. Binding can occur during or after printing. It is preferred that the binding solution be applied to only those regions of the contact lens that are not in the optical zone, or the zone of the contact lens through which one sees.

The process of coating the contact lens can be done by any method that is well known in the art. In one embodiment, the binding solution could be sprayed onto the lens. If this method is used, a mask should be placed over the optical zone of the lens before spraying occurs. In another embodiment, the binding solution could be coated onto the lens using printing pads.

The preferred solvent of the binding solution depends upon the method of coating used. If the spraying method of coating is used, the solvent should have a low viscosity. That is, it is preferred that the viscosity be less than 50 centipoise. If the printing pad method of coating is used, the solvent should have a higher viscosity. That is, it is preferred that the viscosity be greater than 100 centipoise. Viscosity can be adjusted by the addition or subtraction of polymer chains or by the addition or subtraction of a solvent. Organic mixtures are the preferred solvents.

Preferably the binding solution comprises at least one monomer. More preferably, the binding solution comprises at least one hydrophilic monomer and at least one hydrophobic monomer.

"Monomer" means low molecular weight compounds that can be polymerized. Low molecular weight typically means average molecular weights less than 700 Daltons. The term "monomer" also refers to medium and high molecular weight compounds or polymers, sometimes referred to as macromonomers (that is, typically having number average molecular weights greater than 700) containing functional groups capable of further polymerization.

"Polymer" means a material formed by polymerizing one or more monomers.

Nearly any hydrophilic monomer that can act as a plasticizer can be used. The hydrophilic monomer can allow the printed material to deform with the lens without cracking. Among the preferred hydrophilic monomers are 2-hydroxyethyl methacrylate (HEMA), n-vinylpyrolidone (NVP), glycerylmethacrylate (GMA), and N,N-dimethyacrylamide (DMA). This list is exemplary, not limiting.

Nearly any hydrophobic monomer can be used to improve the strength of the coating and to improve the solubility of the monomer in organic solvents. Among the preferred hydrophobic monomers are 2-ethoxyethyl methacrylate (EOEMA), methyl methacrylate (MMA), and n-butyl methacrylate (BMA). This list is exemplary, not limiting.

Preferably, the binding solution contains an initiator. Preferably, a UV or heat-activiting initiator is used.

Preferably, the binding solution makes a tightly cross-linked film that traps the colorants in the film. For this, it is preferable to add ethylene glycol dimethacrylate. Hexamethylenediisocyanate (HMDI) is another preferred crosslinker. This list is exemplary, not limiting. Swelling agents to allow penetration of the monomer into the contact lens and they improve adhesion. Preferred swelling agents include cyclopentanone, cyclohexanone, or methyl ethyl ketone. This list is exemplary, not limiting.

Preferably, the binding solution contains an adhesion promoter. Preferably, the adhesion promoter is HMDI. Nearly any adhesion promoter can be used, including those disclosed in U.S. Pat. No. 5,272,010, which is incorporated by reference herein.

Preferably, the binding solution contains a chain transfer agent. Preferably, the chain transfer agent is mercaptoethanol.

Polyionic materials and/or other materials or additives, including but not limited to, antimicrobials, antibacterials, colorants, cell growth inhibitors, visibility tinting agents, and ultraviolet light tinting dyes, can be applied to an object in a single layer or in many layers to form a coating having a property/functionality pattern. A property/functionality pattern can be any pattern that comprises multiple zones. Exemplary property/functionality patterns include, but are not limited to, a checkerboard pattern, rings, zones comprising shaped regions therewithin, multiple concentric annular zones, annular zones with outer and inner starbursts, and the like.

Preferably, a property/functionality pattern can be integrated with a color image in a coating on the surface of an object.

Once a desired coating is applied to an object, the coating can, in some embodiments, be cross-linked to make the surface even more resistant to wear or abrasion, as well as more durable. The coating can generally be cross-linked by any method known in the art. For example, in one embodiment, a cross-linking agent can be sprayed onto the coating and, thereafter, radiation with visible light can then be applied such that the coating becomes cross-linked. Suitable cross-linking agents can include, for example, active moieties such as carbenes, nitrenes, and the like.

In accordance with the present invention, the methods and apparatus are provided that can be utilized to apply a coating to an object to modify its surface properties and functions and to print a color image thereon. Various techniques for applying polyionic materials and/or other additives to an object will now be described. It should be understood, however, that many techniques not described in detail below can be used in the present invention and that the following description is for exemplary purposes only. In particular, any technique known in the art for applying a coating to an object can be used with the present invention.

Air-Assisted Atomization and Dispensing

A preferred embodiment of the invention is a method for applying a coating to an ophthalmic lens, the method comprising spraying at least one layer of a coating liquid onto an ophthalmic lens using an air-assisted atomization and dispensing process.

Another preferred embodiment of the invention is an apparatus for applying a coating to an ophthalmic lens comprises: a means for securing the ophthalmic lens and a device capable of spraying a layer of a coating liquid onto the ophthalmic lens using an air-assisted atomization and dispensing process.

The air-assisted atomization utilizes pressurized air to mix with a liquid and thereby to form an air-liquid mixture which is then dispensed or delivered through an orifice with an appropriate size onto an object to be coated.

FIG. 1 schematically illustrate a preferred device for applying a coating liquid to an ophthalmic lens using an air-assisted atomization and dispensing process. Referring to FIG. 1, the device comprises a liquid path 110, an air path 120, a mixing chamber 130, and an orifice 140. A first volume of pressured air is mixed with a second volume of a coating liquid in the mixing chamber 130. The mixture is dispensing out the orifice 140 with an appropriate size by air pressure.

FIG. 2 schematically depicts another preferred device for applying a coating liquid to an ophthalmic lens using an air-assisted atomization and dispensing process. Referring to FIG. 2, the device comprises a liquid reservoir 210, a pump 220, a liquid path 230, a mixing chamber 250, an air path 240, a flow restriction device 260 and an orifice 270 with an appropriate size. A first volume of air and a second volume of a coating liquid is mixed in the mixing chamber 250. The mixture is pressured to a prescribed level and then be forced to pass the flow restriction device 260 (e.g., a device built on the basis of the principles of a venturi) to raise its pressure which in turn forces the air-liquid mixture out of the orifice 270.

FIG. 3 schematically illustrates another preferred device for applying a coating liquid to an ophthalmic lens using an air-assisted atomization and dispensing process. Referring to FIG. 3, the apparatus comprises a liquid reservoir 310, a pump 320, a liquid path 330, an inner cannula 340 and an outer cannula 350. The inner cannula 340 comprises an end orifice with an appropriate size 390 and a side orifice 380. A coating liquid is transferred by the pump 320 via the liquid path 330 from the reservoir 310 to the inner cannula 340. The inner cannula contains the coating liquid to be atomized while the space 360 between the inner 340 and outer 350 cannulas contains pressurized air. When the outer cannula 350 is properly rotated and positioned with respect to the inner cannula 340, the side orifice 380 of the inner cannula 340 is exposed to the space 360 to allow the pressurized air to enter into the inner cannula 340 and thereby to atomize/expel the coating liquid onto a coating object.

Ultrasonic-Assisted Atomization and Dispensing

Another preferred embodiment of the invention is a method for applying a coating to an ophthalmic lens, the method comprising spraying at least one layer of a coating liquid onto an ophthalmic lens using an ultrasonic-assisted atomization and dispensing process.

Another preferred embodiment of the invention is an apparatus for applying a coating to an ophthalmic lens comprises: a means for securing the ophthalmic lens and a device capable of spraying a layer of a coating liquid onto the ophthalmic lens using an ultrasonic-assisted atomization and dispensing process.

The ultrasonic-assisted atomization utilizes miniscule mechanical movements which are generated by a piezoelectric crystal attached to or part of a device that can transmit the ultrasonic vibrations. The vibrating device, through these small mechanical motions, causes a volume of fluid to break up, and if air is present in this fluid to mix with the air. The atomized fluid is then dispensed or delivered onto an object to be coated.

Figure 4:
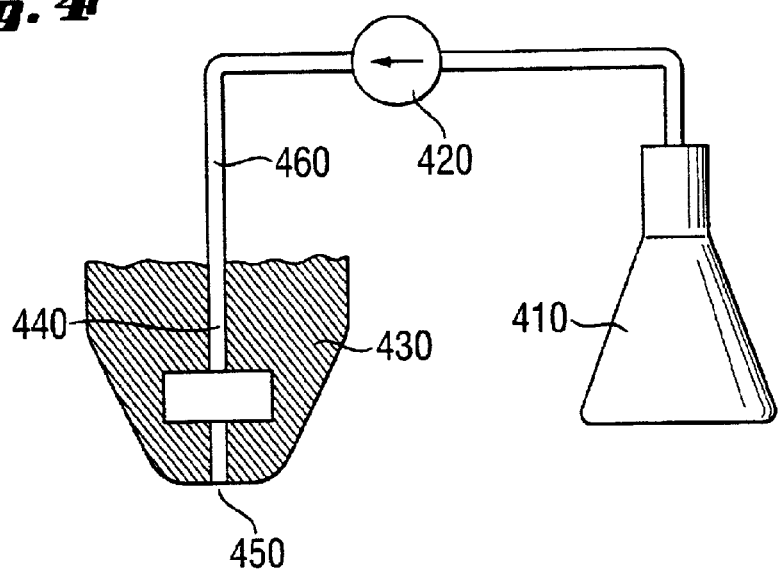
FIG. 4 schematically depicts a preferred device for spraying a coating liquid onto an object using an ultrasonic-assisted atomization and dispensing process.

FIG. 4 schematically depicts a preferred device for spraying a coating liquid onto an ophthalmic lens using an ultrasonic-assisted atomization and dispensing process. Referring to FIG. 4, the device comprises a metal alloy ultrasonic horn 430 driven by a piezoelectric crystal (not shown) which is connected to a pump 420. The ultrasonic horn comprises a fluid cavity 440 and an orifice 450 with an appropriate size at one end. A coating liquid is pumped by the pump 420 from a liquid reservoir 410 to the cavity 440 via a liquid path 460. The ultrasonic horn 430 vibrates at an ultrasonic frequency while the pump forces the liquid to be dispensed through the cavity 440 and ultimately the orifice 450 in the ultrasonic horn onto an object to be coated.

Piezoelectric-Assisted Atomization

Another preferred embodiment of the invention is a method for applying a coating to an ophthalmic lens, the method comprising spraying at least one layer of a coating liquid onto an ophthalmic lens using a piezoelectric assisted atomization and dispensing process.

Another preferred embodiment of the invention is an apparatus for applying a coating to an ophthalmic lens comprises: a means for securing the ophthalmic lens and a device capable of spraying a layer of a coating liquid onto the ophthalmic lens using a piezoelectric assisted atomization and dispensing process.

Figure 5A:
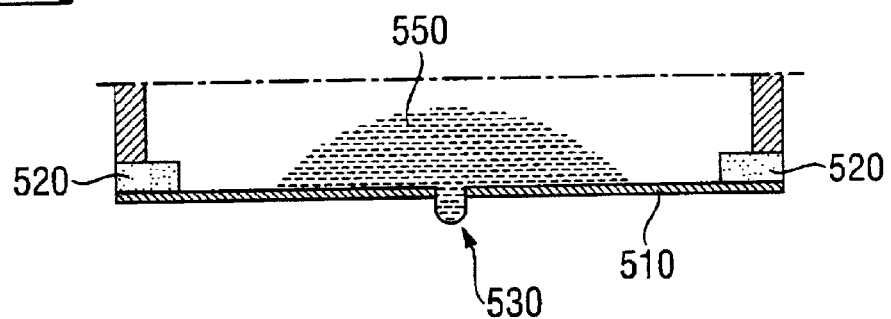
FIG. 5 illustrates a preferred for applying a coating liquid to an object using a piezoelectric assisted atomization and dispensing process.
Figure 5B:
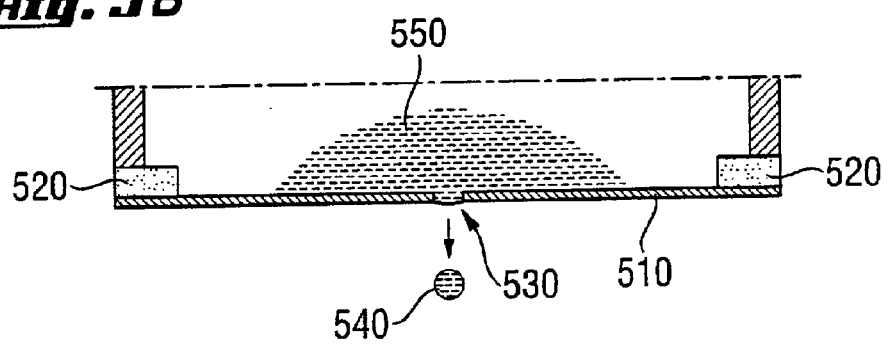

FIG. 5 illustrates a preferred for applying a coating liquid to an ophthalmic lens using a piezoelectric assisted atomization and dispensing process. A volume of a coating liquid is atomized using a piezoelectric crystal 520 to drive a semi-rigid plate 510 which contains microscopic nozzles 530. As the plate 510 vibrates at a prescribed frequency, due to its rigid attachment to the piezoelectric crystal 520, the inertia of a liquid 550 pushes a finite volume of liquid through the nozzles 530. As the vibration continues through one cycle, the ejected droplet(s) 540 detaches from the liquid 550 behind the plate 510 and is driven (through its own inertial forces) to an ophthalmic lens to be coated.

Electro-Mechanical Precision Dispensing

Another preferred embodiment of the invention is a method for applying a coating to an ophthalmic lens, the method comprising spraying at least one layer of a coating liquid onto an ophthalmic lens using a spraying process selected from the group consisting of an electro-mechanical jet printing process, a piezo-electric jet printing process, a piezo-electric with hydrostatic pressure jet printing process, and a thermal jet printing process.

Another preferred embodiment of the invention is an apparatus for applying a coating to an ophthalmic lens comprises: a means for securing the ophthalmic lens and a device capable of spraying a layer of a coating liquid onto the ophthalmic lens using a spraying process with electro-mechanical precision, wherein the spraying process is selected from the group consisting of an electro-mechanical jet printing process, a piezo-electric jet printing process, a piezo-electric with hydrostatic pressure jet printing process, and a thermal jet printing process.

Figure 6:
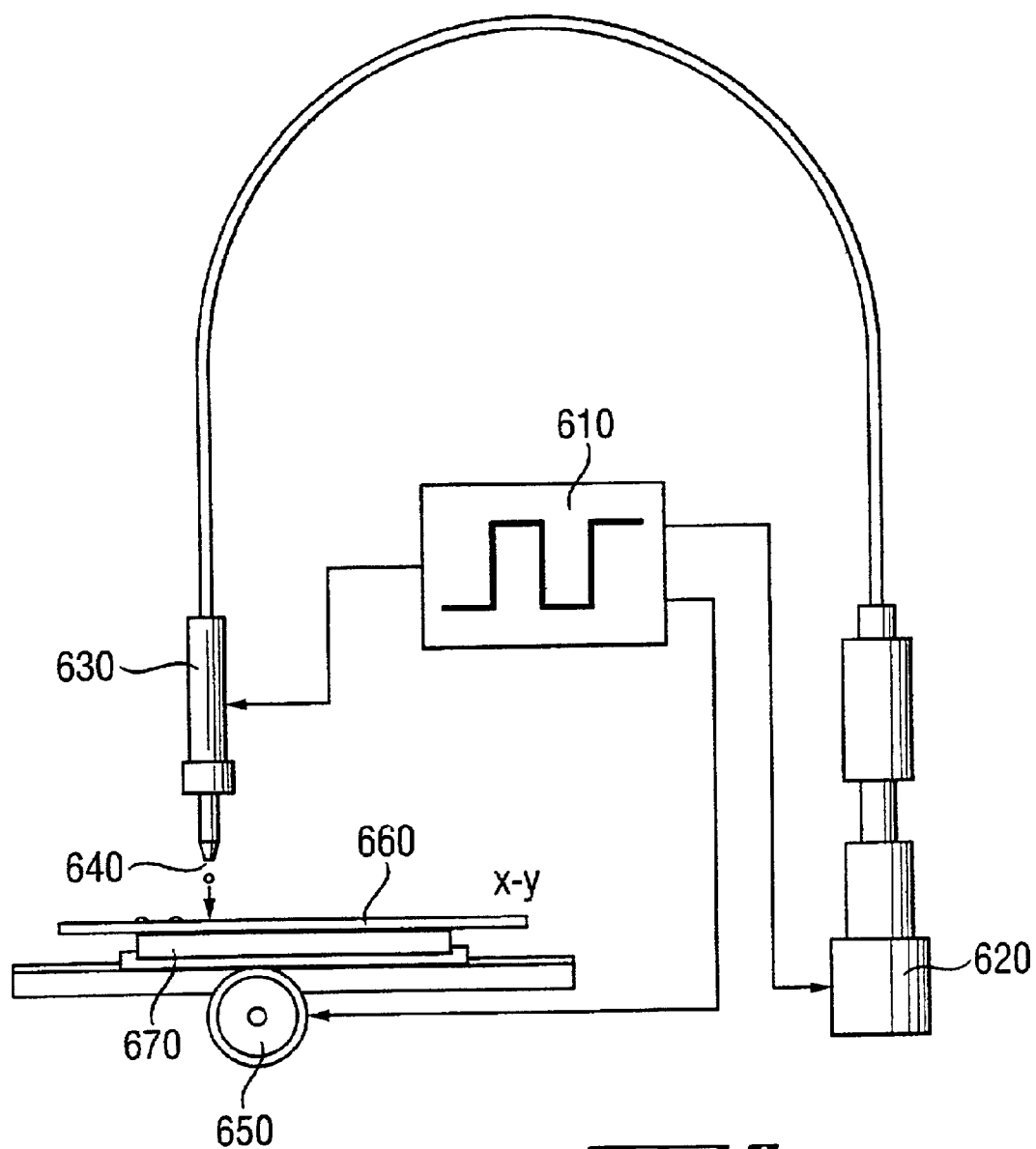
FIG. 6 schematically illustrates a apparatus capable of dispensing a liquid onto an object using an electro-mechanical jet printing process with electro-mechanical precision.

FIG. 6 schematically illustrates a apparatus capable of dispensing a liquid onto an object using an electro-mechanical jet printing process with electro-mechanical precision. Referring to the FIG. 5, the apparatus comprises a computer system served as master controller 610 and a closed circuit pumping system which comprises a syringe pump 620, a very precise solenoid valve 630, and a nozzle or dispensing tip 640. All of the three components, 620, 630, and 640, are electronically driven and controlled by the computer system 610. The object 660 to be sprayed is positioned on an x-y positioning table 670 and moved by a stage stepper motor 650 below the nozzle 640 as droplets are dispensed in some sort of prearranged array pattern. Alternatively, the table 670 is stationary and the nozzle tip 640 can be moved over the object 660 on the table 670.

In another aspect of the invention, ink jet printing technologies can be used in dispensing a defined microscopic volumes (in micron to nano liter range) of a liquid onto an object and creating an array or pattern on the surface of the object. Preferably, an ink jet printing technology used in the invention is selected from the group consisting of piezo-elctric printing, piezo-eletric with hydrostic pressure printing and thermal jet printing.

FIG. 7 schematically depicts a preferred piezo-electric printing device, which comprises a liquid reservoir 720, a piezo head 740, a piezo mesh 730 and oirifices 750. High frequency mechanical vibration, that is generated by a charged piezo ceramic crystal, is used to dispense microscopic volumes of fluid onto an object.

FIG. 8 schematically depicts a preferred piezo-electric with hydrostatic pressure printing device, which comprises a piezo head 830, a container 840 for a liquid 810, and at least one orifice. Depending on the viscosity and wetting characteristics of a liquid, low pressure or vacuum is generated. Droplets are dispensed onto an object.

FIG. 9 schematically depicts a preferred thermal jet printing device, which comprises a container 930 for a liquid 910, a flow control 940, and nozzles 950. Electric current creates high temperature which vaporizes a portion of the liquid in the columns 960 of the nozzles 950 and generates a pressure that in turn fires a droplet.

The methods and apparatus of the invention can be used to apply a coating to a mold used in forming ophthalmic lenses and thereafter forming an ophthalmic lens within the mold such the ophthalmic lens becomes coated with materials contained in a coating liquid.

Exemplary Uses of Spraying Method and Apparatus of the Invention

A more preferred embodiment is an automated apparatus for applying a coating to an ophthalmic lens comprising: (1) a securing means for securing the ophthalmic lens; (2) a device capable of spraying a layer of a coating liquid onto the ophthalmic lens using a spraying process selected from the group consisting of an air-assisted atomization and dispensing process, an ultrasonic-assisted atomization and dispensing process, a piezoelectric assisted atomization and dispensing process, an electro-mechanical jet printing process, a piezo-electric jet printing process, a piezo-electric with hydrostatic pressure jet printing process, and a thermal jet printing process; and (3) a computer system capable of controlling the positioning of the dispensing head of the spraying device on the ophthalmic lens and dispensing the coating liquid. Preferably, the automated apparatus can dispense droplets having a volume of less than 200 picoliters, more preferably less than 100 picoliters, even more preferably less than 50 picoliters, and most preferably less than 10 picoliters.

In an even more preferred embodiment, the automated apparatus for applying a coating to an ophthalmic lens further comprises a patterned mask between the spraying device and the ophthalmic lens. A patterned mask can be used to produce an image or pattern on ophthalmic lens while preventing a coating liquid from spraying onto other portions of the lens.

The automated apparatus of the invention can find use in printing on contact lenses cosmetic patterns including iris-like patterns, WILD EYE™ patterns, made-to-order (MTO) patterns, and the like. Design changes in cosmetic patterns can be implemented easily, especially across different lens materials and products. The pattern printed by digital printing methods and systems of the present invention can have improved resolution and may be richer in detail. The automated apparatus of the invention also allow customers to design any images or patterns to be printed.

The automated apparatus of the invention can also find use in printing on contact lenses inversion marks. Currently, an inversion mark that allows a user to handle and insert easily a contact lens, for example, a FRESHLOOK™ contact lens (Wesley-Jessen Corporation). The printed inversion mark is easier to identify and use than other inversion marks made by non-printing methods including etching, positively molding, or laser etching. The printed inversion marks could also provide stronger lenses, since no material is removed and removal of materials from lenses could cause stress propagation sites. In addition, the printed inversion mark may have less adverse impact on wear comfort, especially with a print-on-mold system. Potentially all contact lens can be printed with an inversion mark. The automated apparatus of the invention can print inversion marks rapidly, potentially faster than pad printing.

The automated apparatus of the invention can also find use in printing on contact lenses stock keeping units (SKUs). Material handling and packaging is always an issue with a large number of SKUs. The digital printing system may allow SKU codes, either in forms of numbers or as bar codes, to be printed either on a mold or in small print on a contact lens itself. In a preferred embodiment, small prints of SKU codes is blended in with an iris pattern or any other cosmetic pattern or inversion marks. In another preferred embodiment, SKU codes is printed discretely in black to be hidden by the iris or in white to be hidden by the sclera. In a further preferred embodiment, an iris pattern is coded to represent SKUs, for example, two thick striations followed by two thin striations represents lenses having a prescription of −3.00 D. By printing SKU codes on contact lenses, the automated apparatus of the invention can aid in monitoring product flow and in verifying product identity in the manufacturing contact lenses. There would be fewer labeling mistakes since every lens could be identified quickly.

The automated apparatus of the invention can further find use in printing on contact lenses identity verification marks. By printing an identity code, such as a bar code, number code, special iris pattern, or any other coding system, onto a contact lens, identity of a contact lens wear can be verified by reading the identity code with a simple camera system, preferably the camera system having colored filters.

Preferably, the identity codes are printed on contact lenses with fluorescent or phosphorescent inks. Such a system can be used for access to buildings, secure rooms, home security system, ATMS, internet sites, and the like. A potential advantage of using this system is that only a person with a correct eye prescription can use the ID coded contact lens.

By using multiple coating solutions with different coating properties, a pattern can be created on an ophthalmic lens by the automated apparatus of the invention. For example, a checkerboard pattern can be created on an ophthalmic lens with the white squares containing a set of surface properties (e.g., hydrophilic) and the black squares containing an additional set of surface properties (e.g., some type of therapeutic properties for some eye abnormality). Another example is that an ophthalmic lens can have on the surface the rim being hydrophobic and the interior being hydrophilic. This particular example may allow a tear film to be trapped within the hydrophobic zone.

By using two coating solutions with different surface properties, for example, one hydrophilic and the other hydrophobic, an asymmetrically coated intraocular lens can be produced. The obtained intraocular lens with an asymmetrical coating may have a better biocompatibility with its surrounding tissue at an position of an eye where it is implanted. As used herein, "asymmetrical coatings" on an ophthalmic lens refers to the different coatings on the first surface and the opposite second surface of the ophthalmic lens. As used herein, "different coatings" refers to two coatings that have different surface properties or functionalities.

What is claimed is:

1. A method of forming a coating on an object comprising:
    forming a coating having a surface property and/or functionality pattern on the surface of the object by alternatively spraying, in a layer-by-layer manner, at least a first coating liquid and a second coating liquid onto the object,
wherein each of the first and second coating liquids comprises at least one polyionic material and optionally one or more materials or additives selected from the group consisting of an antimicrobial, an antibacterial, a colorant, a cell growth inhibitor, a cell growth inducing material. a visibility tinting agent, and an ultraviolet light tinting dye,
wherein the surface property and/or functionality pattern comprises at least a first set of zones and a second set of zones,
wherein the first set of zones has a first set of surface properties and/or functionalities imparted by the first coating liquid while the second set of zones has a second set of surface properties and/or functionalities imparted by the second coating liquid,
wherein the first set of surface properties and/or functionalities is different from the second set of surface properties and/or functionalities,
wherein spraying of at least two coating liquids onto the object is performed by using a spraying process selected from the group consisting of an air-assisted atomization arid dispensing process, an ultrasonic-assisted atomization and dispensing process, a piezoelectric assisted atomization and dispensing process, an electro-mechanical jet printing process, a piezo-electric jet printing process, a piezo-electric with hydrostatic pressure jet printing process, and a thermal jet printing process, and
wherein the object is an ophthalmic lens, a mold for making the ophthalmic lens, or a medical device other than ophthalmic lens.

2. A method of claim 1, wherein the object is a contact lens or a mold for making the contact lens.

3. A method of claim 2, wherein the property/functionality pattern comprises zones with regular shapes or irregular shapes or combination thereof.

4. A method of claim 3, wherein the property/functionality pattern comprises checkerboard pattern, rings, zones comprising shaped regions therewithin, multiple concentric annular zones, annular zones with outer and inner starbursts.

5. A method of claim 4, wherein the spraying process is a thermal jet printing process.

6. A method of claim 4, wherein the spraying process is a piezo-electric with hydrostatic pressure jet printing process.

7. A method of claim 4, wherein the coating further comprises a color image selected from the group consisting of a cosmetic pattern, an inversion mark, a SKU code, and an identity code, wherein the property and/or functionality pattern is integrated with the color image in the coating.

8. A method of claim 4, wherein the spraying process is an air-assisted atomization and dispensing process.

9. A method of claim 4, wherein the spraying process is an ultrasonic-assisted atomization and dispensing process.

10. A method of claim 4, wherein the spraying process is a piezoelectric assisted atomization and dispensing process.

11. A method of claim 4, wherein the spraying process is an electro-mechanical jet printing process.

12. A method of claim 4, wherein the spraying process is a piezo-electric jet printing process.

13. A method of applying asymmetrical coatings to an object having a first surface and an opposite second surface comprising:
    1) forming a first coating on the first surface of the object by spraying, in a layer-by-layer manner, a first series of coating liquids onto the first surface using a first spraying process selected from the group consisting of an air-assisted atomization and dispensing process, an ultrasonic-assisted atomization and dispensing process, a piezoelectric assisted atomization and dispensing process, an electro-mechanical jet printing process, a piezo-electric jet printing process, a piezo-electric with hydrostatic pressure jet printing process, and a thermal jet printing process; and
    2) forming a second coating on the second surface of the object by spraying, in a layer-by-layer manner, a second series coating liquids onto the second surface using a second spraying process selected from the group consisting of an air-assisted atomization and dispensing process, an ultrasonic-assisted atomization and dispensing process, a piezoelectric assisted atomization and dispensing process, a piezo-electric jet printing process, a piezo-electric with hydrostatic pressure jet printing process, and a thermal jet printing process,
wherein the first and second coatings have surfaces properties and/or functionalities different from each other.

14. A method of claim 13, wherein the object is an ophthalmic lens, a mold for making the ophthalmic lens, or a medical device other than ophthalmic lens.

15. A method of claim 14, wherein the object is a contact lens or a mold for making the contact lens.

16. A method of claim 15, wherein the first and second spraying process are air-assisted atomization and dispensing processes.

17. A method of claim 15, wherein the first and second spraying process are ultrasonic-assisted atomization and dispensing processes.

18. A method of claim 15, wherein the first and second spraying process are piezoelectric assisted atomization and dispensing processes.

19. A method of claim 15, wherein the first and second spraying process are electro-mechanical jet printing processes.

20. A method of claim 15, wherein the first and second spraying process are piezo-electric jet printing processes.

21. A method of claim 15, wherein the first and second spraying process are piezo-electric with hydrostatic pressure jet printing processes.

22. A method of claim 15, wherein the first and second spraying process are thermal jet printing processes.

* * * * *